US010878029B2

(12) United States Patent
Mitra et al.

(10) Patent No.: US 10,878,029 B2
(45) Date of Patent: Dec. 29, 2020

(54) INCORPORATING SOCIAL-NETWORK CONNECTIONS INFORMATION INTO ESTIMATED USER-RATINGS OF VIDEOS FOR VIDEO RECOMMENDATIONS

(71) Applicant: Adobe Inc., San Jose, CA (US)

(72) Inventors: Saayan Mitra, San Jose, CA (US); Viswanathan Swaminathan, Saratoga, CA (US); Teng Xu, Los Angeles, CA (US)

(73) Assignee: Adobe Inc., San Jose, CA (US)

( * ) Notice: Subject to any disclaimer, the term of this patent is extended or adjusted under 35 U.S.C. 154(b) by 449 days.

(21) Appl. No.: 14/850,678

(22) Filed: Sep. 10, 2015

(65) Prior Publication Data

US 2017/0075908 A1    Mar. 16, 2017

(51) Int. Cl.
G06F 16/735    (2019.01)
G06F 16/78    (2019.01)

(52) U.S. Cl.
CPC .......... *G06F 16/735* (2019.01); *G06F 16/78* (2019.01)

(58) Field of Classification Search
CPC .................. G06F 17/30828; G06F 16/735
See application file for complete search history.

(56) References Cited

U.S. PATENT DOCUMENTS

| 5,704,017 | A | 12/1997 | Heckerman et al. | |
|---|---|---|---|---|
| 7,756,879 | B2* | 7/2010 | Parsons | G06Q 30/02 707/748 |
| 2004/0172267 | A1* | 9/2004 | Patel | G06Q 10/0635 705/7.29 |
| 2010/0268661 | A1* | 10/2010 | Levy | G06Q 30/02 705/347 |
| 2013/0013622 | A1* | 1/2013 | Elliot-McCrea | G06F 16/48 707/751 |
| 2013/0110772 | A1* | 5/2013 | Svendsen | G06F 17/30029 707/609 |
| 2015/0019640 | A1* | 1/2015 | Li | G06Q 30/0269 709/204 |

OTHER PUBLICATIONS

Wen, "Recommendation System Based on Collaborative Filtering", 2008.*

(Continued)

*Primary Examiner* — Dawaune A Conyers
(74) *Attorney, Agent, or Firm* — SBMC (57) ABSTRACT

Techniques for incorporating social-network connections information into estimated user-ratings of videos for video recommendations are described. A user-rating that a user is likely to assign to a video is predicted based on first and second predictions. The first prediction is based on ratings assigned to the video by a first set of users who have rated other videos with ratings substantially similar to the user's ratings of the other videos. The second prediction is based on ratings assigned to the video by a second set of users who have established social-network connections with the user and who have rated at least one same video that the user has previously rated. Additionally, the estimated user-rating is added to additional estimated user-ratings of other videos for comparison, and top-rated videos are identified. Then, a notification is communicated via a client device of the user to recommend the top-rated videos to the user.

20 Claims, 7 Drawing Sheets

(56) References Cited

OTHER PUBLICATIONS

Yang et al., "On Top-k Recommendation using Social Networks", 2012.*
Shang et al., "Wisdom of the Crowd: Incorporating Social Influence in Recommendation Models", 2013.*
Sánchez Non Patent Publication ("Improving Collaborative Filtering Based Recommender Systems Using Pareto Dominance", 2013 (Year: 2013).*
Breese,"Empirical Analysis of Predictive Algorithms for Collaborative Filtering", Proceedings of Uncertainty in Artificial Intelligence, May 1998, 21 pages.
Bu,"Music Recommendation by Unified Hypergraph: Combining Social Media Information and Music Content", In Proceedings of the International conference on Multimedia, Oct. 2010, 10 pages.
Canny,"Collaborative Filtering with Privacy via Factor Analysis", In SIGIR 02: Proceedings of the 25th annual international ACM SIGIR conference on Research and development in information retrieval, Aug. 2002, 8 pages.
Cremonesi,"Cross-domain Recommendations without Overlapping Data: Myth or Reality?", In Proceedings of the 8th ACM conference on Recommender systems, 2014, 4 pages.
Deshpande,"Item-Based Top-N Recommendation Algorithms", ACM Transactions on Information Systems, 2004, 34 pages.
Dooms,"MovieTweetings: a Movie Rating Dataset Collected From Twitter", In Workshop on Crowdsourcing and Human Computation for Recommender Systems, CrowdRec at RecSys, 2013., 2013, 3 pages.
Fernandez-Tobias,"Cross-domain recommender systems: A survey of the State of the Art", In Proceedings of the Spanish Conference on Information Retrieval (CERI), Jun. 2012, 12 pages.
Fernandez-Tobias,"Exploiting Social Tags in Matrix Factorization Models for Cross-domain Collaborative Filtering", In CBRecSys 2014, 2014, pp. 34-40.
Herlocker,"An Algorithmic Framework for Performing Collaborative Filtering", Proceedings of the 22nd annual international ACM SIGIR conference on Research and development in information retrieval, 1999, 8 pages.
Hofmann,"Latent Semantic Models for Collaborative Filtering", ACM Transactions on Information Systems, 2004, 27 pages.
Koren,"Matrix factorization techniques for recommender systems", In IEEE journal of Computer vol. 42, issue 8, Aug. 2009, pp. 42-49.
Kuter,"Using Probabilistic Confidence Models for Trust Inference in Web-Based Social Networks", ACM Transactions on Internet Technology, vol. 10, No. 2, Article 8, Publication date: May 2010., May 2010, 23 pages.
Li,"Can Movies and Books Collaborate? Cross-Domain Collaborative Filtering for Sparsity Reduction", Proceedings of the Twenty-First International Joint Conference on Artificial Intelligence (IJCAI-09), 2009, pp. 2052-2057.
Linden,"Amazon.com Recommendations: Item-to-item collaborative filtering", Internet Computing, IEEE, 7(1), 76-80., 2003, pp. 76-80.
Ma,"SoRec: Social Recommendation Using Probabilistic Matrix Factorization", ACM, 2008, 10 pages.
Massa,"Trust-aware Collaborative Filtering for Recommender Systems", In Proceedings of CoopIS/DOA/ODBASE, 2004, 17 pages.
Mei,"10 Contextual Video Recommendation by Multimodal Relevance and User Feedback", In ACM Transactions on Information Systems (TOIT), 2011, 24 pages.
Rendle,"Factorization Machines with libFM", ACM Trans. Intell. Syst. Technol., 3(3), May 2012, 22 pages.
Rendle,"Factorization Machines", 2010, 6 pages.
Rennie,"Fast Maximum Margin Matrix Factorization for Collaborative Prediction", Proceedings of the 22th International Conference on Machine Learning, 2005., 2005, 7 pages.
Srebro,"Generalization Error Bounds for Collaborative Prediction with Low-Rank Matrices", In NIPS, 2004, 2004, 8 pages.
Xue,"Scalable Collaborative Filtering Using Cluster-based Smoothing", In SIGIR 05: Proceedings of the 28th annual international ACM SIGIR conference, 2005, pp. 114-121.
Zhao,"Leveraging Social Connections to Improve Personalized Ranking for Collaborative Filtering", In 23rd ACM International Conference on Information and Knowledge, Nov. 2014, 10 pages.

* cited by examiner

INCORPORATING SOCIAL-NETWORK CONNECTIONS INFORMATION INTO ESTIMATED USER-RATINGS OF VIDEOS FOR VIDEO RECOMMENDATIONS

BACKGROUND

Collaborative filtering techniques allow recommendation systems to sift through an ever increasing amount of online digital content (e.g., videos, images, files, and so on) and identify content to recommend to a user for viewing that the user is likely to enjoy. Conventional collaborative filtering techniques filter the digital content based on video similarity and user similarity for recommendations, seeded with an available set of user ratings. In this way, the recommendations are based on ratings of a video by other users who are similar to the user.

Additionally, these conventional collaborative filtering systems generally include memory-based approaches and model-based approaches. The memory-based approaches operate over an entire user database to make predictions. Some memory-based approaches (e.g., user-based algorithms) focus on users who share the same rating patterns with a target user, while other memory-based approaches (e.g., item-based algorithms) focus on a relationship between items (e.g., videos). Systems built on model-based approaches identify patterns or latent features within a training set of users or items by using low-rank approximations of an available ratings matrix. Typical algorithms of the model-based approaches include clustering models, Bayesian networks, latent factor models, and so on.

Generally, however, these conventional techniques rely on an assumption that all users are independent and identically distributed, which is not necessarily true for many users. For instance, some of the users may be friends and may influence one another's tastes and preferences. These conventional collaborative filtering techniques, however, fail to account for any such factors, and resulting recommendations are imprecise.

SUMMARY

Techniques for incorporating social-network connections information into estimated user-ratings of videos for video recommendations are described. In one or more implementations, a social model is constructed as a binary matrix that represents a user's social-network connections with a first set of users who have previously rated at least one same video that the user has rated. Additionally, a ratings model is created to represent ratings assigned to a set of videos by a second set of users who have a high ratings similarity to the user. Then, the social model and the ratings model are used in various ways to predict a user-rating of a video that has not been viewed by the user. In addition, the predicted user-rating is compared to additional estimated user-ratings of other videos to identify top-rated videos that can be recommended to the user via a notification sent to a client device of the user.

In at least one approach for predicting the user-rating of a video, a nearest social neighbor (NSN) method is used, which combines two different predictions to estimate the user-rating of the video. The first prediction is based on ratings data that includes ratings assigned to the video by a set of users who have previously rated videos with ratings that are substantially similar to ratings assigned to the videos by the user (referred to herein as "ratings neighbors"). The second prediction, however, is based on social data that includes ratings assigned to the video by another set of users who have established social-network connections with the user and who have previously rated at least one same video that the user has previously rated (referred to herein as "social neighbors").

In another approach for predicting the user-rating of the video, a social-based collective matrix factorization method is used, which jointly optimizes both the social model and the ratings model using a loss function minimization approach to predict the user-rating of the video. This approach is an iterative approach, and both the social model and the ratings model are used in each iteration. In an additional approach for predicting the user-rating of the video, social-based factorization machines are applied to both the social model and the ratings model to predict the user-rating of the video.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional collaborative filtering techniques are imprecise because they generally rely on the assumption that all users are independent and identically distributed, which is untrue for many users who may interact socially with one another. For example, many users may interact with others in the real World and/or online via social networks such as Twitter®, Facebook®, and so on. These interacting users may influence one another's tastes and preferences. Some users may even rely on their friends with whom they are connected via the social networks for various recommendations, such as a recommendation for a movie. These conventional collaborative filtering techniques, however, fail to recognize and account for the effect of social influences on a user by the user's friends or contacts, such as online friends or contacts, who are connected to the user via a social network.

Techniques involving incorporation of social-network connections information into estimated user-ratings of videos for video recommendations are described for enhancing video recommendation systems. In the following discussion, a variety of different implementations are described that involve video recommendations based on incorporation of social-network connections information into estimated user-ratings for videos. In implementations, a user's social-network connections with one or more people (e.g., contacts with whom the user is a "friend" or a "follower" via a social network) are modeled as a binary social matrix. For example, if the user is "following" another user, then the "following" relationship is represented as "1", and "0" otherwise. Only explicitly established social-network connections are represented as "1", and no other connections are inferred in the social matrix. A user "following" another user refers to the user having subscribed to the other user via a social network to receive updates associated with the other user.

This social matrix represents the influence that a user's online friends or contacts may have on his preferences in movies, television shows, or other videos. For example, when a user posts a link to a video on a social network, the user is effectively recommending that video to his friends and followers. Depending on how much the user's friends and followers value the user's opinion, they may be likely to click on the link to view the video that the user effectively recommended, may be likely to enjoy the video as much as the user enjoyed it, and may be further inclined to rate the video similar to the user's rating of the video. Thus, the user can influence those friends and followers, and likewise, the user may be influenced by his friends and the people that he follows. For example, the user's preferences in movies, television shows, or other videos can be influenced by his friends and/or the people he follows. Accordingly, the social matrix represents these online relationships and the associated social influence that those relationships have on the user's preferences in videos.

The social matrix is then incorporated into a ratings domain in various ways, such as by using cross-domain algorithms, to improve the accuracy of predicting user-ratings that the user is likely to assign to various videos that the user has not yet viewed. These user ratings can then be used to predict which movies the user is likely to enjoy. Some example ways of incorporating the social matrix into the ratings domain include using a nearest social neighbor approach, a social-based collective matrix factorization approach, or a factorization machines approach. Each of these approaches can be used to predict the user-rating that the user is likely to assign to a video that the user has not yet viewed, based on ratings of the video by the user's social neighbors as well as the user's ratings neighbors. Each of these approaches are described in detail below.

Then, based on a comparison of the predicted user-ratings of the videos for the user, one or more top-rated videos are recommended to the user for viewing. In this way, the videos that are recommended to the user are at least partially based on the influence that the user's online friends or contacts have in affecting the user's tastes and preferences in videos or video content.

In the following discussion, an example environment is first described that may employ the techniques described herein. Example procedures are then described which may be performed in the example environment as well as other environments. Consequently, performance of the example procedures is not limited to the example environment and the example environment is not limited to the performance of the example procedures.

As used herein, the term "social-network connection" refers to an online relationship or connection between users that is established via a social network. By way of example and not limitation, the user may be socially connected to another person as a "friend" such as via Facebook®, or a "follower" such as via Twitter®. In the Twitter® example, however, the other person may not necessarily follow the user in return. This "follower" relationship can therefore be a one-way relationship, whereas in the "friend" relationship both users follow one another. Thus, the term social-network connection can refer to a variety of connections between users via any of a variety of social networks.

As used herein, the term "ratings similarity" may refer to a measure of similarity between users who rate videos similarly. For example, two users who rated a same movie similarly, such as both users giving the movie a score of ten out of ten, may have a high ratings similarity. In contrast, a low ratings similarity may exist between a user who rates the movie with a score of four out of ten and another user who rates the movie with a score of nine out of ten. The ratings similarity of can be used to predict what rating a first user might assign to a new movie, by using ratings of the movie assigned by other users who exhibit a pattern of ratings movies similar to the first user. Because the first user has a history of rating movies in a substantially similar manner to these other users who have a high ratings similarity to the first user, an assumption can be made that the first user may rate the new movie similarly to the other users' ratings of the new movie.

As used herein, the term "social neighbor" refers to a person or entity with whom a user is connected via a social network, and who has previously rated at least one same video that the user has previously rated. In other words, the user's social neighbors include a subset of the user's online friends or contacts, where the friends in the subset have rated at least one same video that the user has previously rated. Accordingly, the user's social neighbors do not include all of the people or entities with whom the user has established social-network connections. For example, if Sasha and Braden are "friends" via a social network, and have both rated the same movie, then Sasha and Braden are considered to be each other's social neighbor. Alternatively, if Jack and Joe are "friends" via a social network but have not rated any of the same videos, then Jack and Joe are not considered to be social neighbors, despite their social-network connection. Further, if Hilary is a "follower" of Stephanie via a social network, and both Hilary and Stephanie have rated the same movie, then Stephanie is a social neighbor of Hilary. However, in this example, Hilary is not considered to be a social neighbor to Stephanie if Stephanie does not "follow" Hilary.

As used herein, the term "video" is representative of a sequence of images processed electronically into an analog or digital format and which is displayable via a display device with sufficient rapidity as to create an illusion of motion and continuity (e.g., moving images). Some examples of video include movies, films, slide shows, television programs, video recordings, music videos, and so on. Further examples of the above-described terms may be found in relation to the following discussion.

Example Environment

Figure 1:
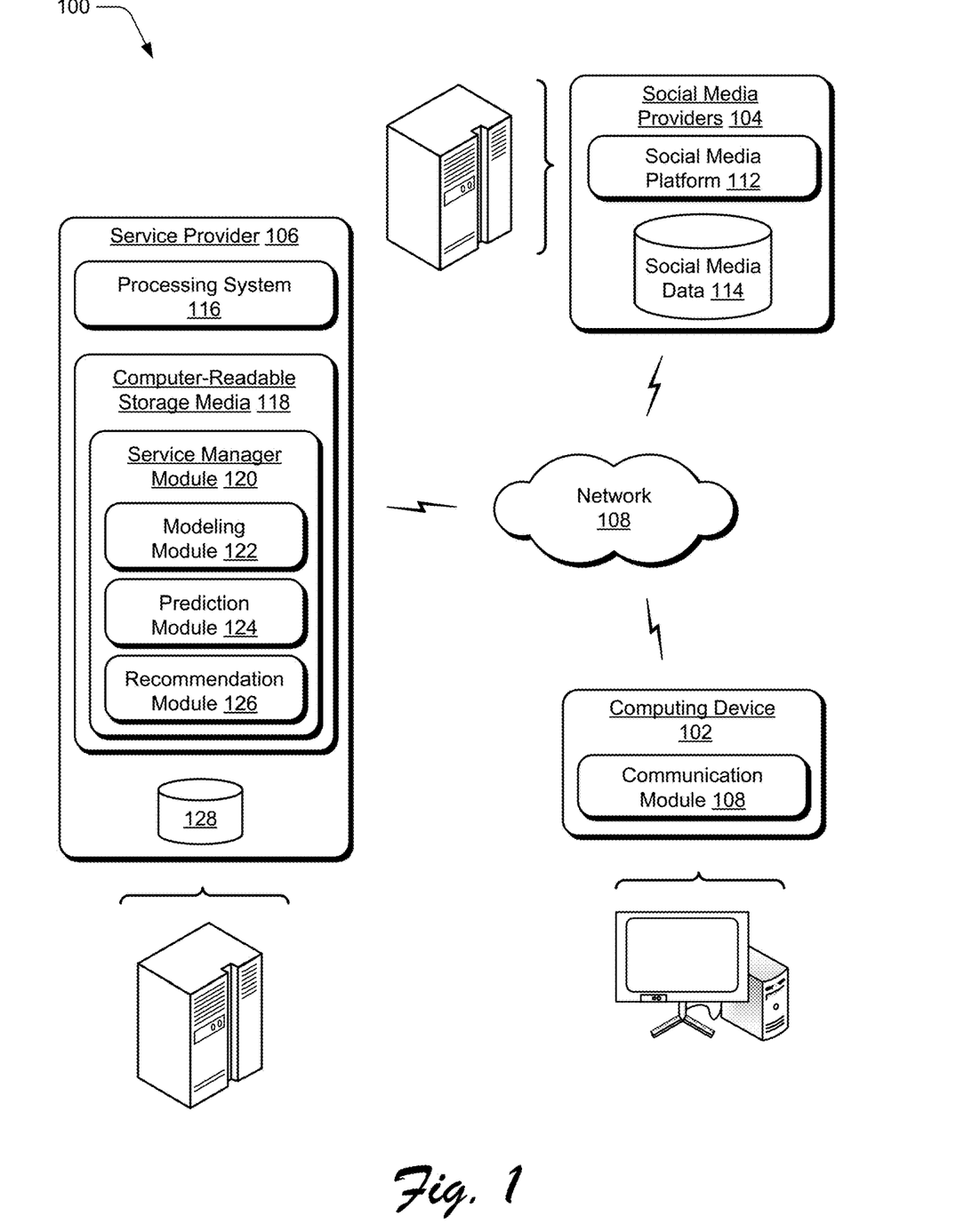
FIG. 1 is an illustration of an environment in an example implementation that is operable to employ techniques for incorporating social-network data into video recommendations.

FIG. 1 is an illustration of an environment 100 in an example implementation that is operable to employ techniques described herein. The illustrated environment 100 includes a computing device 102, social media providers 104, and a service provider 106 that are communicatively coupled via a network 108. In addition, the computing device 102 as well as computing devices that implement the social media providers 104 and the service provider 106 may be configured in a variety of ways.

The computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 106 utilized by a business to perform operations "over the cloud" as further described in relation to FIG. 7.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be representative of multiple networks.

The computing device 102 is also illustrated as including a communication module 110. The communication module 110 is representative of functionality to communicate via the network 108, such as with one or more services of the social media providers 104 or the service provider 106. As such, the communication module 110 may be configured in a variety of ways. For example, the communication module 110 may be configured as a browser that is configured to "surf the web." The communication module 110 may also be representative of network access functionality that may be incorporated as part of an application, e.g., to provide network-based functionality as part of the application, an operating system, and so on. Thus, functionality represented by the communication module 110 may be incorporated by the computing device 102 in a variety of different ways.

The social media providers 104 are representative of various enterprises and/or services that provide social media platforms 112 via which different users may interact and communicate. For instance, the social media platforms 112 can include web-based portals for social interaction. At least some of the social media platforms 112, for instance, can include webpages and/or web applications that enable users to view and post content.

Users can interact via the social media platforms 112 in various ways. For instance, a user of computing device 102 can create accounts with different social media platforms 112. Utilizing the accounts, the user can post various types of content to the social media platforms 112, such as text content (e.g., messages), photographs, video, audio, and so on. The user can also utilize the social media platforms 112 to demonstrate an affinity for various content and/or entities, such as by indicating a preference (e.g., "liking") for a particular instance of content, "friending" other users, "following" other users, and so on.

The social media provider 104 is illustrated as also including social media data 114. The social media data 114 can include collections of information corresponding to users (e.g., user profiles) that are usable to track various types of data, such as user preferences, groups of other users known to interact with a particular user (e.g., "followers"), demographic information, and so forth. The social media data 114 can also include social-network connections of a user, such as established symmetric relationships (e.g., "friend" relationships) or asymmetric relationships (e.g., "follower" relationships). The "friend" relationship includes a mutual relationship between two users who follow each other, such as for example, user A following user B and user B also following user A. In contrast to the "friend" relationship, the "follower" relationship includes a one-way relationship such as for example, user A following user B without user B following user A.

The service provider 106 represents a computing device having a processing system 116 that includes one or more processing devices (e.g., processors) and one or more computer-readable storage media 118. The computer-readable storage media 118 includes a service manager module 120 operable via the processing system 116 to implement corresponding functionality described herein. Although not illustrated, the computing device 102 and the social media providers 104 also include corresponding processing systems and computer-readable storage media to implement corresponding functionality described herein.

The service provider 106 is representative of functionality to provide one or more network-based services. The services are managed by the service manager module 120 to support a variety of different functionality. The services (e.g., web services), for instance, may be configured to support various functionalities associated with different network-based services, such as video recommendation, user-rating prediction, social-network connections modeling, and so on. Thus, a variety of different types of functionalities may be performed via the services supported by the service provider 106.

The service manager module 120 is configured to manage processing of data and/or content requested or provided by the computing device 102. In some instances, a user may wish to communicate with the service provider 106 to request recommended videos. The service manager module 120 can process the user's request and, if needed, communicate the request to an appropriate entity to properly service the request. In addition, the service manager module 120 can communicate with the social media providers 104 to obtain information associated with the user, such as the user's social-network connections, that can be incorporated into video recommendations for the user. Alternatively or additionally, the service manager module 120 can retrieve the information regarding the user's social-network connections from the computing device 102 of the user.

The service manager module 120 is illustrated as including a modeling module 122, a prediction module 124, and a recommendation module 126. These modules can be components of, or remote from, the service manager module 120, or any combination thereof. In implementations, the service manager module 120 can utilize the modeling module 122, the prediction module 124, and the recommendation module 126 to perform a variety of functionalities that are described in more detail below.

The modeling module 122 is representative of functionality to provide one or more services of the service provider 106, such as to model a user's social-network connections, such as the user's connections with the social neighbors and ratings neighbors. A variety of different techniques can be used to identify the user's social neighbors and ratings neighbors. The user's social neighbors include people or entities with whom the user is connected via a social network and who have previously rated at least one same video that the user has previously rated. The user's ratings neighbors include other users who have previously rated a set of videos with ratings that are substantially similar to ratings assigned to the set of videos by the user, such that the user and the other users rated the videos with substantially similar scores. In addition, the user's ratings neighbors can include users who have rated videos that are similar to a video that is being analyzed for potential recommendation to the user. Thus, the modeling module 122 is configured to model a variety of data, and is described in further detail below.

The prediction module 124 is representative of functionality to provide one or more services of the service provider 106, such as to predict user-ratings that the user is likely to assign to videos that the user has not yet viewed. The prediction module 124 is configured to leverage the user's social-network connections, modeled by the modeling module 122, to modify the predicted user-rating that the user is likely to assign to particular videos. For instance, the prediction module 124 is configured to modify the predicted user-rating by simulating influences that the user's online friends have on the user's tastes and preferences in videos.

The recommendation module 126 is representative of functionality to provide one or more services of the service provider 106, such as to recommend top-rated videos to the user based on the predicted user-ratings of the videos. For example, the recommendation module 126 is configured to compare the predicted user-ratings of various videos to identify which videos have the relatively highest predicted user ratings. Additionally, the recommendation module 126 can initiate communication of a notification to the computing device 102 of the user to recommend the top-rated videos to the user for viewing.

The service provider 106 is also illustrated as including storage 128, which may be a component of the service provider 106, may be remote from the service provider 106, or may be a third-party database. The storage 128 may be a single database, or may be multiple databases, at least some of which include distributed data. Thus, a variety of different types of storage mechanisms can be utilized for the storage 128. Further discussion of this and other features is provided below.

Example Implementation

The following discussion describes example implementations of incorporating social-network connections information into estimated user-ratings of videos for video recommendations that can be used to perform various aspects of techniques discussed herein. The example implementations may be used in the environment 100 of FIG. 1, the system 700 of FIG. 7, and/or any other suitable environment.

Figure 2:
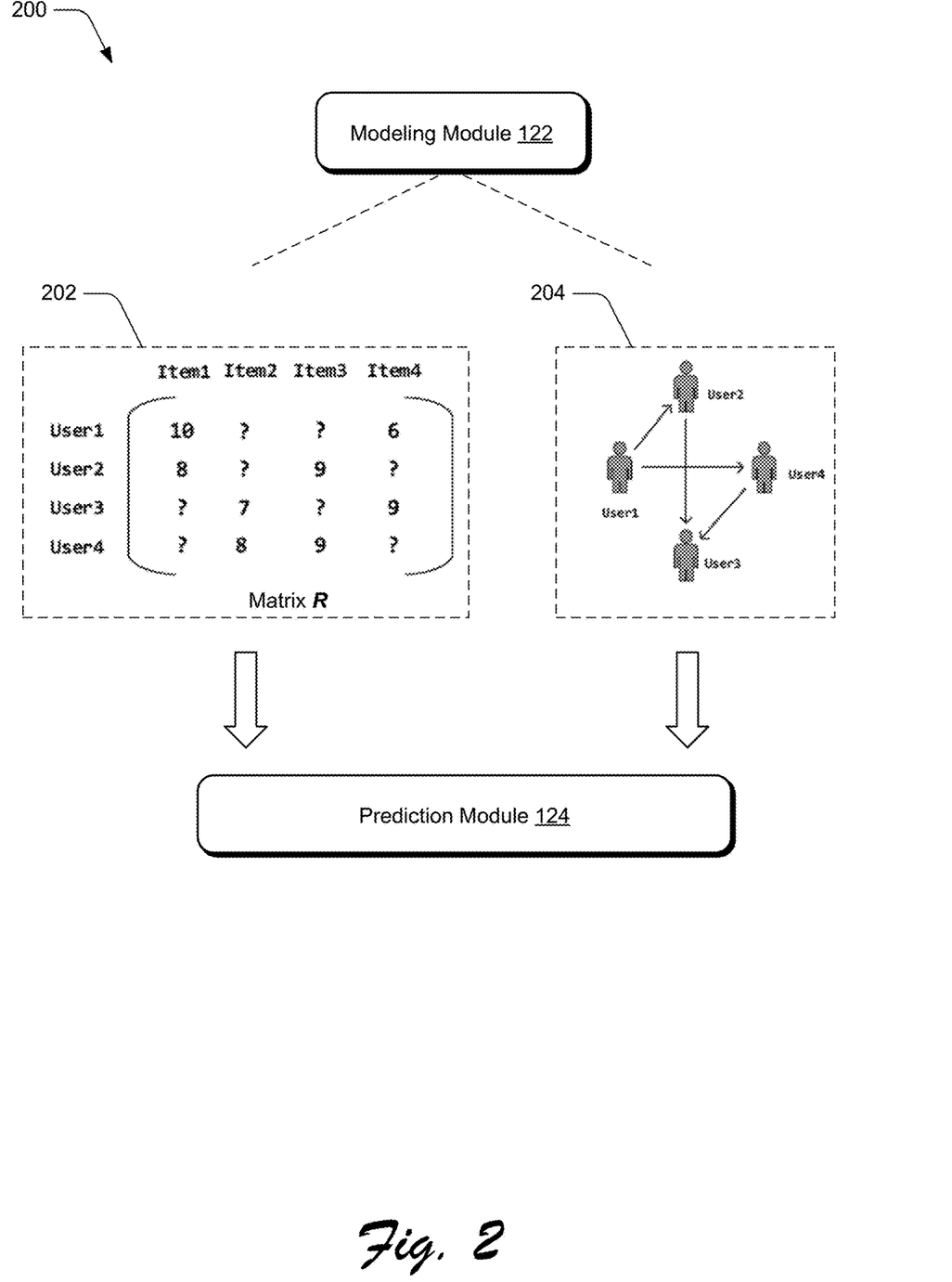
FIG. 2 is an illustration of an example implementation that is operable to employ techniques associated with a modeling module of FIG. 1 in further detail.

FIG. 2 is an illustration of an example implementation 200 that is operable to employ techniques associated with the modeling module 122 of FIG. 1. In implementations, the modeling module 122 is representative of functionality to build models that represent different domains and which can be used in cross-domain techniques to refine recommendations in a particular domain using information from a different domain. Cross-domain techniques can apply to a variety of domains such as books, music, video, and so on. The domain where predictions are made is referred to as the target domain, whereas available information associated with a user or item is referred to as the auxiliary domain.

A major aspect of providing personalized recommendations is to predict ratings of items, such as videos, not yet viewed by a user. These video ratings form the target domain. The challenge for the prediction can be finding missing terms in a user-item matrix (e.g., user-by-video matrix). FIG. 2 illustrates an example matrix R 202 with four users and four items. The element R[i,j] in the matrix is the rating of user i to item j. The matrix R 202 is seeded with existing ratings already provided by users (1)-(4), while unknown entries (denoted by "?") are items that have not yet been rated by the corresponding user. Using the matrix R 202, the prediction module 124 can predict the unknown ratings, or in other words, fill in the missing terms. Based on the prediction results, the items with relatively higher predicted ratings are recommended by the recommendation module 126.

Based on an assumption that the user's online friends or contacts can affect the user's preferences in videos, the influence of those online friends or contacts can be incorporated into the predictions to improve the accuracy of the predictions for the missing terms. For example, the social-network connections 204 (e.g., relationships between the user and the user's online friends or contacts) can be depicted as a graph where each point represents a user, and each edge represents a connection. In implementations, the user's social-network connections 204 are used as the auxiliary domain, and can thereby be included in an auxiliary model.

The modeling module 122 can then send the matrix R 202 and the model of the social-network connections 204 to the prediction module 124. The prediction module 124 is configured to incorporate the user's social-network connections 204 into a variety of different approaches, such as Nearest Social Neighbor (NSN), Collective Matrix Factorization with social data (SCMF), and Social-based Factorization Machines (SFM), for example. In the NSN approach, separate predictions are generated using ratings data and social data, and the separate predictions are linearly combined to produce a final prediction. This approach is an improvement on a k-nearest neighbors (kNN) algorithm. The learning process for the NSN approach involves computing similarities between the users in terms of how those users rated movies (e.g., rating domain) and/or how those users are connected in the social network (social domain).

In the SCMF approach, the user's social-network connections are modeled as a user-user adjacency matrix. Further, this approach is based on an assumption that there exists latent features in the user-user matrix which influence the user-item ratings matrix. The SCMF approach provides a more fine-grained optimization with both the ratings and social matrices involved at every iteration. In the SFM approach, Factorization Machines are applied to at least the social data to predict the user-rating. Further discussion of these approaches is provided below.

Nearest Social Neighbors (NSN)

In the traditional user-based nearest neighbor approach, the predicted rating of user u on video q is based on the following equation:

$$\hat{r}_{uq} = \overline{r}_u + \sum_{v \in N_{uq}} \frac{sim(u,v)}{\sum_{j \in N_{uq}} sim(u,j)} * (r_{vq} - \overline{r}_v) \quad \text{Equation 1}$$

Equation 1 is described in "Empirical Analysis of Predictive Algorithms for Collaborative Filtering" by Breese et al. (1998). In Equation 1, the term $\hat{r}_{uq}$ refers to the predicted rating, the term $\overline{r}_u$ refers to an average rating of the user u, and the term $N_{uq}$ refers to a set of neighbors of the user u. In implementations, only the "neighbors" who have rated video q are in the set $N_{uq}$. The term sim(u, v) represents the similarity between the user u and a user v, and the term sim(u, v) is normalized across all the similarities between the user u and the users in $N_{uq}$, as shown in Equation 1.

In implementations, sim(u, v) can be calculated using a conventional Pearson correlation coefficient, which provides a quantifiable way to compare data sets from different domains. The Pearson coefficient is described in Breese, and can be shown in the following equation:

$$sim(u, v) = \frac{\sum_{i \in I_{uv}} (r_{ui} - \overline{r}_u)(r_{vi} - \overline{r}_v)}{\sqrt{\sum_{i \in I_{uv}} (r_{ui} - \overline{r}_u)^2 \sum_{i \in I_{uv}} (r_{vi} - \overline{r}_v)^2}} \quad \text{Equation 2}$$

In Equation 2, the term $I_{uv}$ refers to a set of videos that are rated by both the user u and the user v. In addition, the term $r_{ui}$ denotes the rating of the user u on video i, and the term $\overline{r}_u$ refers to the average rating of the user u across all the videos in the set $I_{uv}$.

The essence of the nearest neighbor approach is to predict the user u's rating on the video i based on the user u's neighbors' ratings on the video i. The neighbors that are more similar to the user u (e.g., neighbors that tend to rate videos more similarly to ratings of the user) will presumably have larger influence on the rating prediction. This is reflected by the corresponding sim(u, v) having a larger weight in Equation 1. Here the set of "neighbors" can be defined differently according to different algorithms. For instance, in the conventional kNN algorithm, the "neighbor" set of the user u only contains the k most similar users to the user u. Alternatively, in some instances, the "neighbor" set can contain all users whose similarity to the user u exceed a particular threshold value.

In the kNN algorithm, the set of nearest neighbors is only based on ratings similarity, which refers to similarities between ratings of videos assigned by the users and the user. In implementations, the ratings similarity between users can include implicit constraints, such as movies of the same genre, a same actor, similar content, and so on. For example, if a user A has rated a movie A highly, and a user B has rated a movie B highly, where both movies A and B are of the same genre such as action movies, then the ratings similarity would tend to be very high between user A and user B.

The NSN approach utilizes a modified nearest neighbor algorithm specifically on the social network of users. Here, the set of social neighbors is based on social similarity, which refers to friends or contacts of the user who have established social-network connections with the user and who have previously rated at least one same video that the user has previously rated. For example, if the user and these contacts have previously rated same videos similarly, it can be assumed that they may assign similar ratings to other videos as well. In implementations, the social similarity only includes explicit constraints, and is not based on inferences. For example, the set of social neighbors only includes a subset of the user's online friends or contacts, specifically those who have rated at least one same video that the user has previously rated. Other online friends or contacts of the user who have not previously rated at least one same video as the user are not included in the set of social neighbors. Further, friends of the user's friends who are not connected to the user via a social network are not included in the set of social neighbors.

In implementations, the social influence of user A on user B is measured by calculating the Pearson correlation between user A and user B. However, the social influence can be calculated using any of a variety of techniques. In an example, the social influence of user A on user B is regarded as "1" if user A is followed by user B, and the social influence is valued as "0" otherwise. The relationship between user A and user B can be symmetric (e.g., user A is followed by user B and user B is followed by user A), or asymmetric (e.g., user A is followed by user B but user B is not followed by user A). Thus, a social-network relationship between two users is not necessarily mutual.

In one or more implementations, the social influence reflects an assumption that connected users are likely to assign substantially similar ratings to a same video when those users have previously rated other same videos similarly. For example, if user A has a relatively high influence score over user B, then it is assumed that user B may assign substantially similar ratings to a same video as user A. If, for instance, a user posts or shares a video on Twitter®, all of that user's followers may read the post and some of those followers may click to view the video, which potentially forms an action of video recommendation. Accordingly, users connected via the social network are likely to influence each other's tastes with their choice of videos.

Using the kNN algorithm in multi-domain nearest neighbor selection was proposed by Shi et al. in "Exploiting User Similarity Based on Rated-Item Pools for Improved User-Based Collaborative Filtering," (2009). In contrast to the kNN algorithm, the NSN approach described herein, is applied to a domain of social networks. In the NSN approach, a first prediction is generated using the nearest neighbor approach (e.g., prediction derived from ratings similarity), and a second prediction is generated based on the social neighbors who are connected to the user via the social network and who also rated at least one same video as the user (e.g., prediction derived from social similarity). These two predictions are linearly combined in the following equation:

$$\hat{r}_{uq} = \overline{r}_u + (1-\alpha) \sum_{v \in N_{uq}} \frac{sim(u, v)}{\sum_{j \in N_{uq}} sim(u, j)} * (r_{vq} - \overline{r}_v) + \alpha \sum_{w \in S_{uq}} \frac{soc(u, w)}{\sum_{k \in S_{uq}} soc(u, k)} * (r_{wq} - \overline{r}_w) \quad \text{Equation 3}$$

In Equation 3, the term $S_{uq}$ refers to a set of social neighbors, and the term soc(u, w) denotes the social influence value of the user w on the user u. A higher soc(u, w) reflects a stronger social influence of user w on user u. In implementations, the term soc(u, w) is defined as "1" if user u is following user w and soc(u, w) is defined as "0" if user u is not following user w. In addition, the term $\alpha$ refers a weight of social factor in the overall prediction. In implementations, the term $\alpha$ can vary from zero to one, and can be optimized by cross validation.

Social-Based Collective Matrix Factorization (SCMF)

Matrix factorization models map both users and videos to a joint latent factor space. The user-video matrix R is represented as a product of two low-rank matrices U and V in the following equation:

$$R = UV \quad \text{Equation 4}$$

The matrix R can be factorized into U and V by using conventional techniques, such as techniques described in Koren et al., "Matrix Factorization Techniques For Recommender Systems," (2009). One such technique described by Koren includes minimizing a loss function in the following equation:

$$L(U, V) = \frac{1}{2}\sum_{u=1}^{K}\sum_{j=1}^{N} I_{uj}^{R}(R_{uj} - U_u^T V_j)^2 + \frac{\lambda}{2}(\|U\|_F^2 + \|V\|_F^2) \quad \text{Equation 5}$$

In Equation 5, the term $U_u$ refers to the uth column of matrix U, the term $V_j$ refers to the jth column of matrix V. In addition, the term $R_{uj}$ refers to the user u's rating on video j. Also, the term $I_{uj}^R$ denotes an indicator variable that equals one when $R_{uj} > 0$, and otherwise equals zero. The term $$\frac{\lambda}{2}(\|U\|_F^2 + \|V\|_F^2)$$

is for regularization to prevent overfitting. Equations 3-5 are based on the assumption that a set of latent features exists for each individual user as well as each video.

In the SCMF approach, the ratings matrix R and a user-user adjacency matrix S are used as a starting point. Each iteration of the SCMF approach involves both the ratings data and the social data. By doing so, both the social relationships and the ratings patterns are used to extract the latent user features. In other words, the features that make a user connect with certain users in the social domain, and the features that make the user enjoy a video have some correlation.

The SCMF approach assumes a common factor between the ratings matrix R and a second matrix S, where the matrix S represents a user-user adjacency matrix based on social-network connections information. This common factor is represented by the following:

$$R = UV$$
$$S = UZ \quad \text{Equation 6}$$

In Equation 6, the two matrices R and S share a common factor U reflecting the assumption that the users share a common latent feature space or characteristic. For users who have rated very few videos but have many connections in the social domain, the additional modality offered by the social matrix can increase the accuracy of the predictions. The loss function of the conventional CMF approach, as described by Koren, can be expressed in the following equation:

$$L(U, V, Z) = \frac{1-\alpha}{2}\sum_{u=1}^{K}\sum_{j=1}^{N} I_{uj}^{R}(R_{uj} - U_u^T V_j)^2 + \quad \text{Equation 7}$$

$$\frac{\alpha}{2}\sum_{u=1}^{K}\sum_{j=1}^{M} I_{un}^{S}(S_{un} - U_u^T Z_n)^2 + \frac{\lambda}{2}(\|U\|_F^2 + \|V\|_F^2 + \|Z\|_F^2)$$

In Equation 7, the loss function L has three terms, where the first term refers to the difference between R and UV, the second term denotes the difference between S and UZ, and the last term is a regularization term. Also, the term $I_{un}^S$ is an indicator variable that equals "1" if $S_{un} > 0$, and "0" otherwise. In addition, the term $\alpha$ is a parameter that controls the tradeoff weight between R and S.

In the SCMF approach described herein, the social-network connections information is incorporated into the CMF algorithm by using a user-user social matrix as the auxiliary matrix S to be factorized. In implementations, the loss function in Equation 7 can be minimized to identify unique features using gradient descent, which produces the following:

$$\frac{\partial L}{\partial U_u} = (1-\alpha)\sum_{j=1}^{N} I_{uj}^{R}(U_u^T V_j - R_{uj})V_j + \quad \text{Equation 8}$$

$$\alpha \sum_{n=1}^{M} I_{un}^{S}(U_u^T Z_n - S_{un})Z_n + \lambda U_u$$

$$\frac{\partial L}{\partial V_j} = (1-\alpha)\sum_{u=1}^{K} I_{uj}^{R}(U_u^T V_j - R_{uj})U_u + \lambda V_j$$

$$\frac{\partial L}{\partial Z_n} = \alpha \sum_{u=1}^{K} I_{un}^{S}(U_u^T Z_n - S_{un})U_u + \lambda Z_n$$

In Equation 8, the gradients of L(U, V, Z) with respect to U, V, and Z are given. Here, the gradient is computed with respect to U, V, and Z each by fixing the other two. Then, U, V, and Z are updated in each iteration to determine L(U, V, Z) that can be used to represent the prediction of a user-rating that user u is likely to assign to video j.

Social-Based Factorization Machine (SFM)

Factorization machines (FM) provide a mechanism for prediction where available ratings data is sparse, as described by Rendle, "Factorization Machines," (2010). In FM, each user rating a video is modeled as a feature vector. In addition, available auxiliary information associated with the user, or a context of the rating, is included as part of the feature vector.

Figure 3:
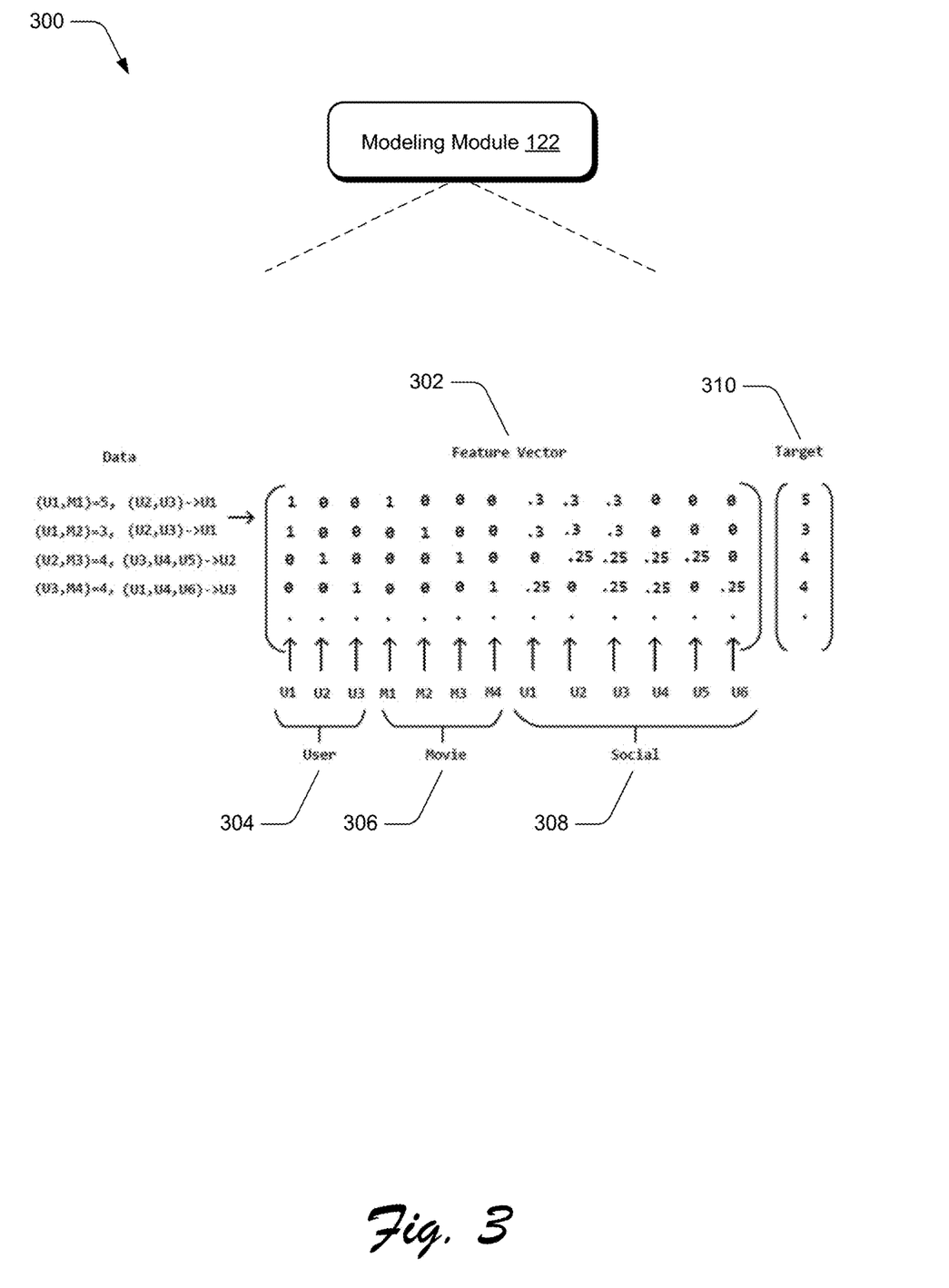
FIG. 3 illustrates an example implementation of the modeling module of FIG. 1 in further detail.

FIG. 3 illustrates an example implementation 300 of a feature vector 302 that can be applied in SFM. The feature vector comprises a user portion 304, a video portion 306, and a social portion 308. The user portion 304 and the video portion 306 indicate which user or movie, respectively, that the feature is describing. In addition, the social portion 308 shows the social-network connections of the user. In an example, assuming the user has n online friends including herself, cell values of the n corresponding positions representing n online friends in the social portion 308 are assigned the value of 1/n, while the other values are zero. Also, the target vector 310 includes corresponding video ratings.

In the illustrated example, the top row represents a rating of "5" that a user U1 has given to a movie M1. For example, the left column of the user portion 304 corresponds to the user U1, and the top-left value is assigned a "1" to correspond to the user U1 while the columns for users U2 and U3 remain zero. The left column of the video portion 306 corresponds to the movie M1 to indicate which movie the user U1 has rated, and the values for movies M2-M4 are zero in the top row. The corresponding top row in the target vector includes a value of "5". This information indicates that the user U1 rated the movie M1 at a value of "5".

In addition to this information, normalized social information is included in the social portion 308 to augment or refine the information. In the illustrated example, the top row of the social portion 308 indicates which of the users U2-U6 is followed by the user U1 via a social network. An assumption is made that the user U1 follows herself. Accordingly, the user U1 is following herself and both users U2 and U3 in this example. Thus, the user U1 is following three people, and these values are normalized to result in a value of "0.3" for each user U1-U3. The values for users U4-U6 remain zero because they are not connected to user U1 in this example. In this way, feature vectors can be formed for all cell values of a user-by-video matrix. Accordingly, the feature vector 302 may have as many rows as there are cells in the user-by-video matrix.

In cross domain recommendations, traditionally the auxiliary domain is utilized to solve cold start or sparsity problems in the target domain. However, given the sparsity of both the ratings data and the social data, SFM can be applied to capture the factorized interactions between feature vectors. Additionally, no hyper-parameters need to be used in the model. A model equation for a factorization of degree two can be expressed, as described by Rendle, with the following:

$$\hat{y}(x) = \omega_0 + \sum_{i=1}^{n} \omega_i x_i + \sum_{i=1}^{n} \sum_{j=i+1}^{n} \langle v_i v_j \rangle x_i x_j \qquad \text{Equation 9}$$

In Equation 9, the term $\omega_o$ refers to a global bias, the term $\omega_i$ refers to a strength of the ith variable, and $\langle v_i v_j \rangle$ refers to the interaction between the ith variable and the jth variable. The term $\hat{y}(x)$ refers to the predicted user-rating of a particular video. By applying the feature vector 302 in SFM to the second degree FM, factorized interactions between datasets can be captured to make the predictions.

Example Procedures

The following discussion describes techniques for incorporating social-network connections information into estimated user-ratings of videos for video recommendations that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 4:
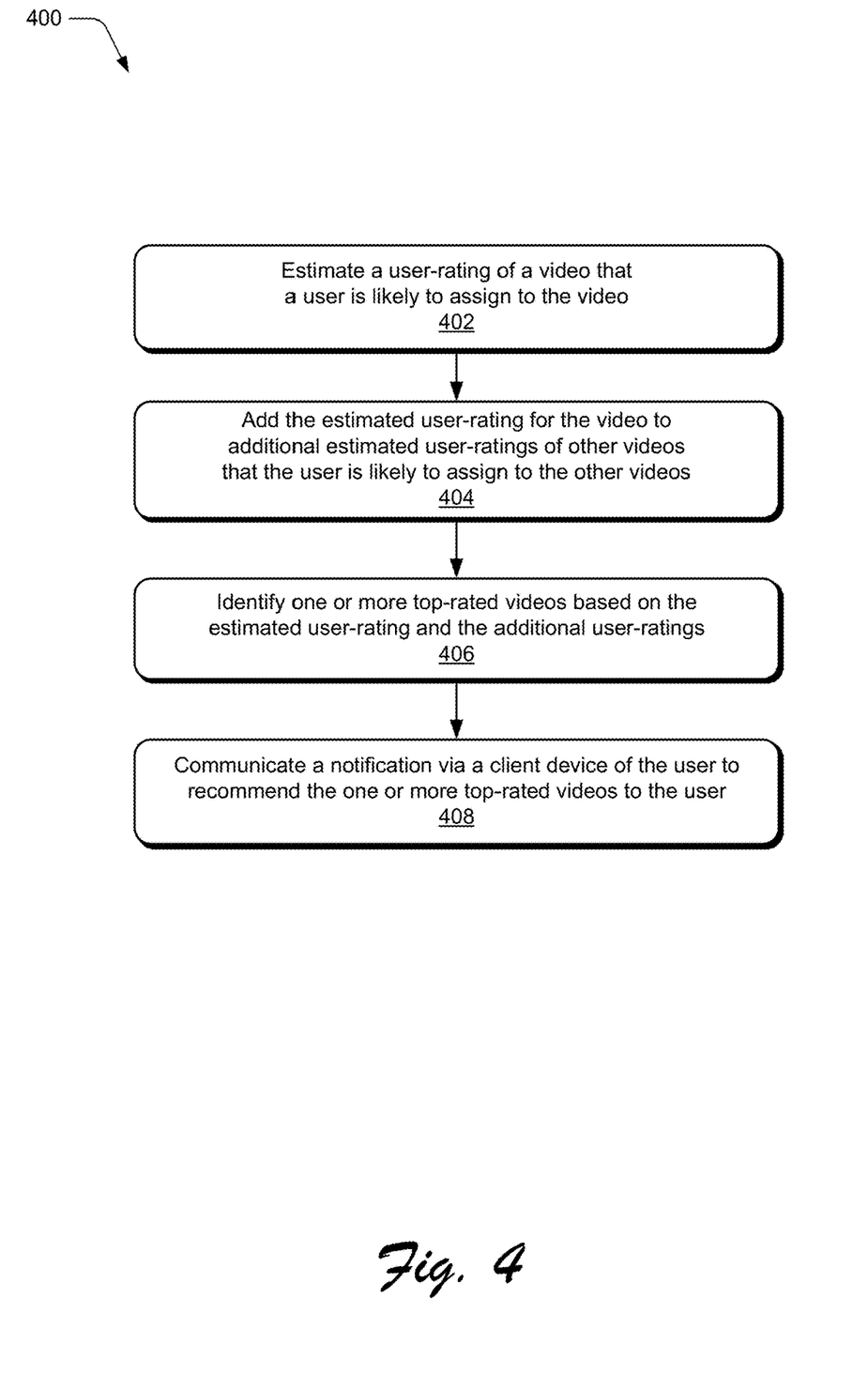
FIG. 4 is a flow diagram depicting a procedure in an example implementation in which techniques are described for incorporating social-network data into video recommendations using a nearest social neighbor approach.

FIG. 4 is a flow diagram depicting a procedure 400 in an example implementation in which techniques for incorporating social-network connections information into estimated user-ratings of videos for video recommendations are employed. A user-rating of a video that a user is likely to assign to the video is estimated (block 402). For example, the user-rating can be estimated or predicted by the prediction module 124 based on a combination of a first prediction and a second prediction. In implementations, the first prediction can be based on ratings data that includes ratings assigned to the video by a first set of users who have previously rated other videos with ratings that are substantially similar to ratings assigned to the other videos by the user. Additionally, the second prediction can be based on social data that includes ratings assigned to the video by a second set of users who have established social-network connections with the user and who have rated at least one same video that the user has previously rated.

In addition, at least one of the social-network connections of the user can include an asymmetric relationship in which the user is a follower of another user, but that other user is not a follower of the user. For example, Bob can follow Billy in a one-way relationship without Billy following Bob. Alternatively or additionally, at least one of the social-network connections of the user can include a symmetric relationship in which the user follows another user and that other user follows the user in return. For example, Jane follows Kristine and Kristine also follows Jane.

In implementations, the social model is constructed by the modeling module 122 by determining which users in the second set of user have rated at least one same video that the user has previously rated. This determination is made without inferring trust relationships between the user and persons connected to the user's online friends. For example, if user A is connected to user B, and user B is connected to user C, no inference is made as to whether user A is connected to user C. Instead, the determination is based on whether an explicit connection exists between user A and user C. In addition, the social data can be modeled as a user-by-user binary matrix, while the ratings data can be modeled as a user-by-video matrix.

The estimated user-rating of the video is added to additional estimated user-ratings of other videos that the user is likely to assign to the other videos (block 404). For example, the storage 128 can maintain a list of estimated user-ratings corresponding to various videos for the user. The recommendation module 126 can add a new estimated user-rating to the list, and sort or otherwise organize the list to identify top-rated videos for recommendation to the user.

One or more top-rated videos are identified based on the estimated user-rating and the additional estimated user-ratings (block 406). For example, the list of predicted user-ratings can be analyzed by the recommendation module 126 to identify relatively highest user-ratings and corresponding videos. A notification is communicated via a client device of the user to recommend the one or more top-rated videos to the user (block 408). This step can be performed in any suitable way. For example, the recommendation module 126 can initiate communication of a notification to the user via the social media provider 104, which can then cause the notification to be presented as a video recommendation via a user interface associated with the social media provider 104, such as a website, a web application, a mobile application, and so on. Alternatively, the notification can be sent from the service provider 106 directly to the computing device 102 of the user. Thus, the notification can be sent to the computing device of the user in any of a variety of different ways.

Figure 5:
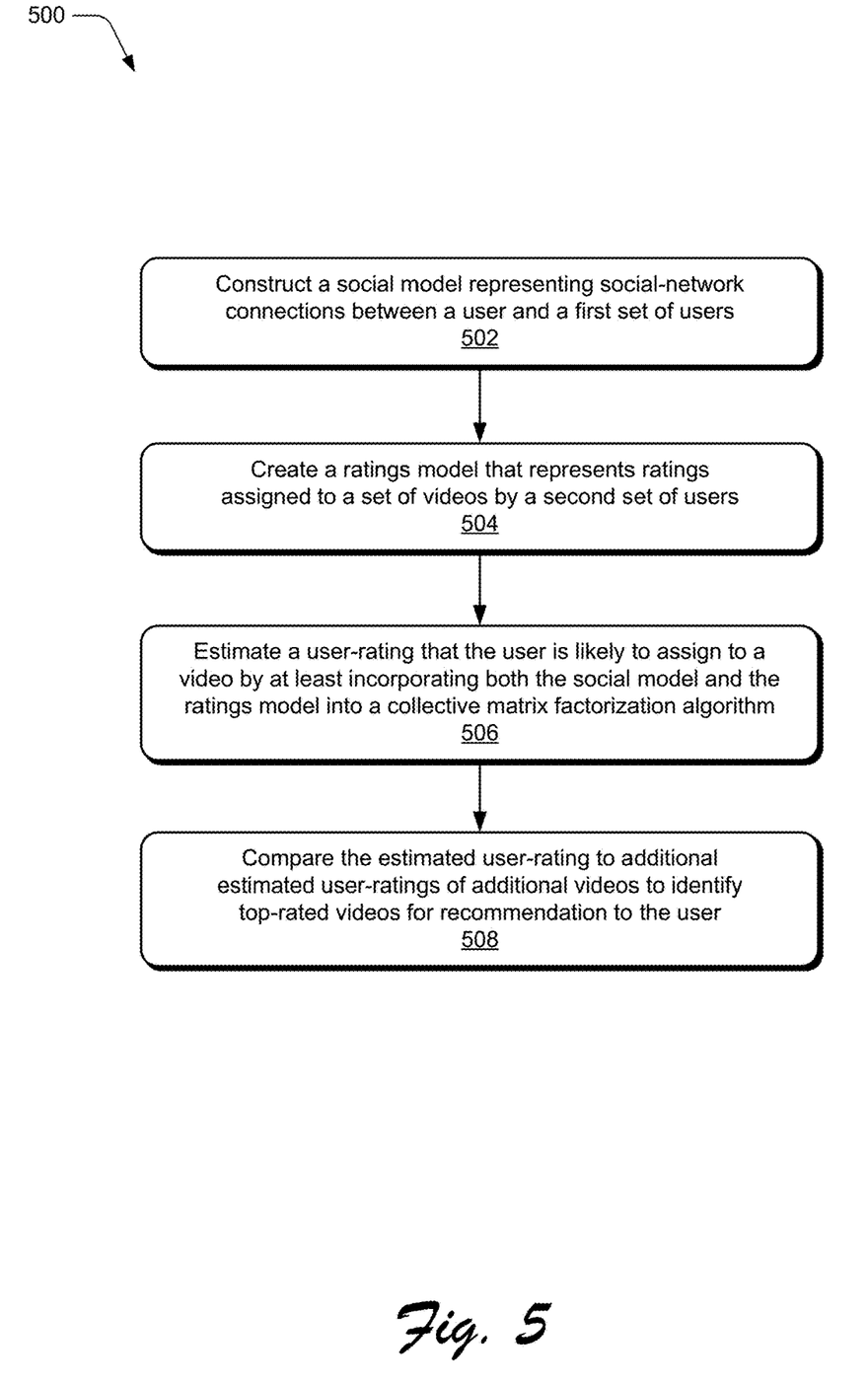
FIG. 5 is a flow diagram depicting a procedure in an example implementation in which techniques are described for incorporating social-network data into video recommendations using a social-based collective matrix factorization approach.

FIG. 5 illustrates a flow diagram depicting a procedure 500 in an example implementation in which techniques for incorporating social-network connections information into estimated user-ratings of videos for video recommendations are employed. A social model representing social-network connections between a user and a first set of users is constructed (block 502). In one or more implementations, the social model is constructed as a binary matrix that represents a subset of the user's contacts who are connected via a social network and who have rated at least one same video that the user has previously rated. In addition, the social model can include an adjacency matrix based on a number of connections in the user's social-network connections. For example, the adjacency matrix can include columns representing a set of users, and rows representing users for whom the ratings are to be predicted.

A ratings model that represents ratings assigned to a set of videos by a second set of users is created (block 504). This step can be performed in any suitable way, examples of which are described above. A user-rating that the user is likely to assign to a video is estimated by at least incorporating both the social model and the ratings model into a collective matrix factorization algorithm (block 506). In implementations, both the social model and the ratings model are utilized in each iteration of the collective matrix factorization algorithm.

The estimated user-rating is compared to additional estimated user-ratings of additional videos to identify top-rated videos for recommendation to the user (block 508). This step can be performed in any suitable way, examples of which are described above.

Figure 6:
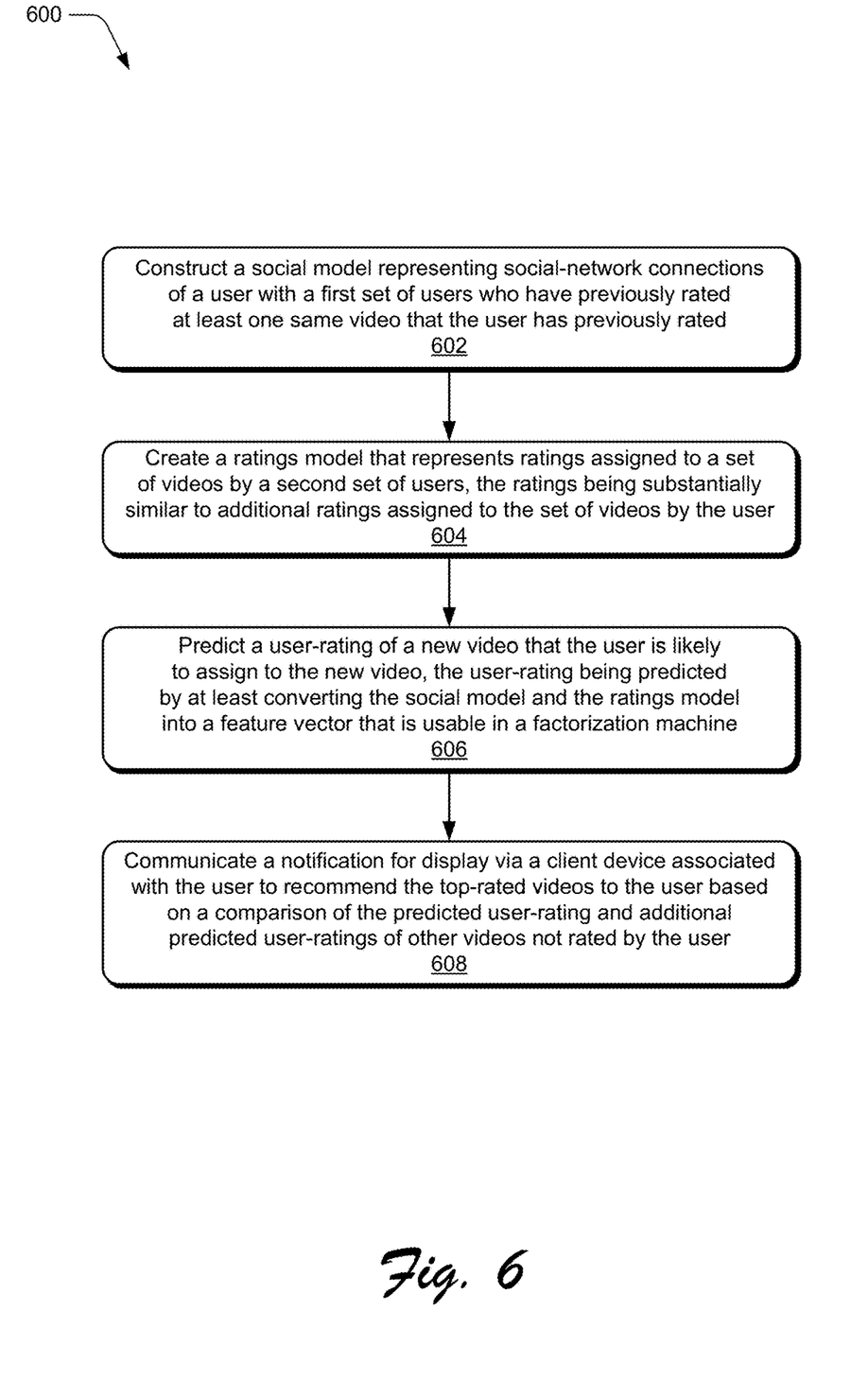
FIG. 6 is a flow diagram depicting a procedure in an example implementation in which techniques are described for incorporating social-network data into video recommendations using a social-based factorization machines approach.

FIG. 6 illustrates a flow diagram depicting a procedure 600 in an example implementation in which techniques for incorporating social-network connections information into user-ratings of videos for video recommendations are employed. A social model is constructed to represent social-network connections of a user with a first set of users who have previously rated at least one same video that the user has previously rated (block 602). In addition, a ratings model is created that represents ratings assigned to a set of videos by a second set of users (block 604). In implementations, the ratings are substantially similar to additional ratings assigned to the set of videos by the user. Accordingly, the user and the second set of users tend to rate videos similarly.

A user-rating of a new video that the user is likely to assign to the new video is predicted (block 606). In implementations, the user-rating is predicted by at least converting the social model and the ratings model into a feature vector that is usable in a factorization machine, examples of which are described above. Additionally, a notification is communicated for display via a client device associated with the user to recommend the top-rated videos to the user based on a comparison of the predicted user-rating with additional predicted user-ratings of other videos not rated by the user (block 608).

Example System and Device

Figure 7:
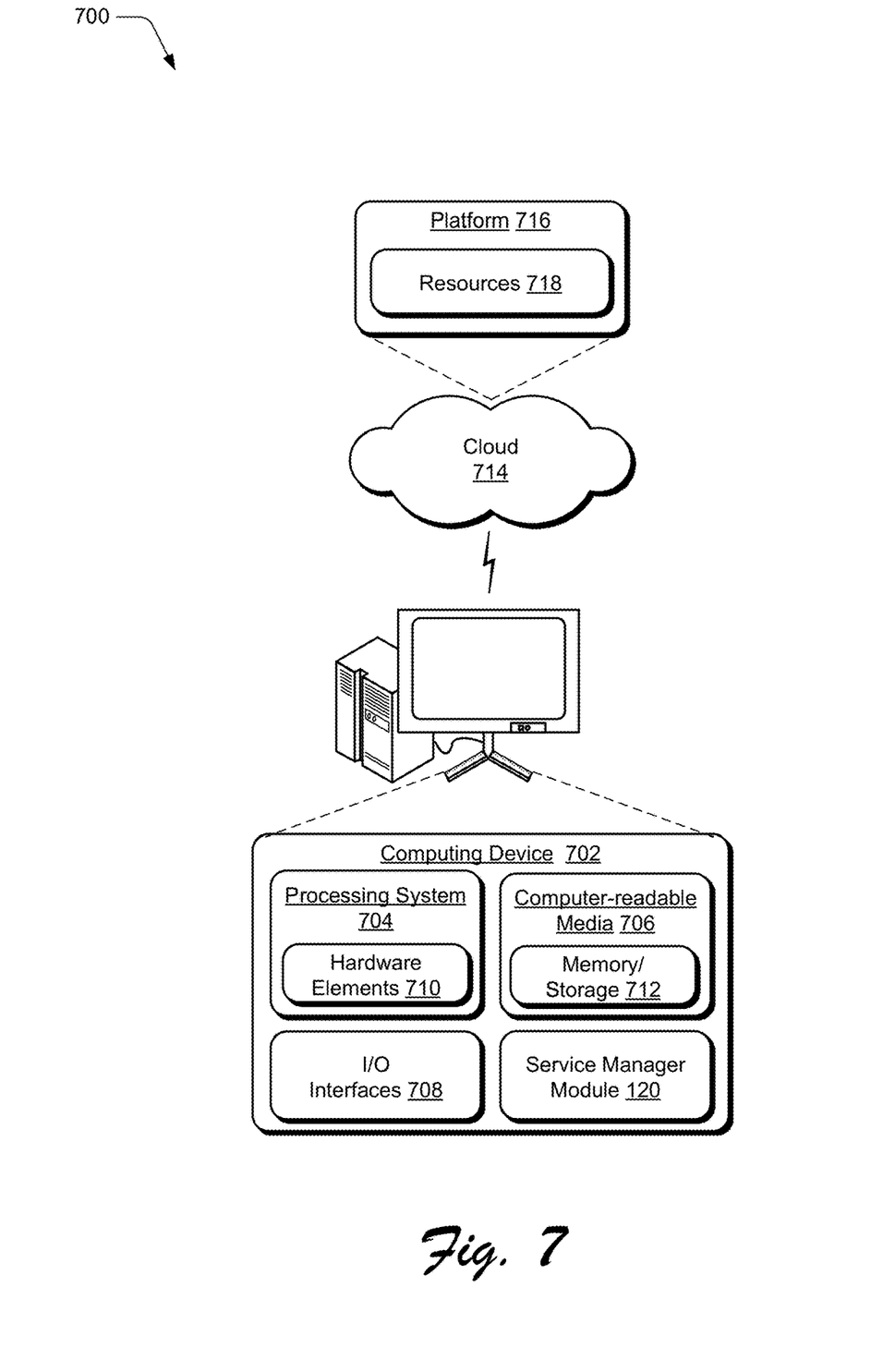
FIG. 7 illustrates various components of an example device that can be implemented as any type of computing device as described herein to implement the techniques described herein.

FIG. 7 illustrates an example system generally at 700 that includes an example computing device 702 that is representative of one or more computing systems and/or devices that may implement the various techniques described herein. This is illustrated through inclusion of service manager module 120, which may be configured to recommend videos to a user using information from the user's social-network connections. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

Cloud 714 includes and/or is representative of a platform 716 for resources 718. Platform 716 abstracts underlying functionality of hardware (e.g., servers) and software resources of the cloud 714. Resources 718 may include applications and/or data that can be utilized while computer processing is executed on servers that are remote from the computing device 702. Resources 718 can also include services 720 provided over the Internet and/or through a subscriber network, such as a cellular or Wi-Fi network.

Platform 716 may abstract resources and functions to connect computing device 702 with other computing devices. Platform 716 may also serve to abstract scaling of resources to provide a corresponding level of scale to encountered demand for resources 718 that are implemented via platform 716. Accordingly, in an interconnected device embodiment, implementation of functionality described herein may be distributed throughout system 700. For example, the functionality may be implemented in part on computing device 702 as well as via platform 716 that abstracts the functionality of cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method for incorporating social-network connections information into an estimated user-rating of a video for video recommendations, the method comprising:

identifying, by a prediction module, a first set of users, each user of the first set of users having rated at least one additional video with a rating that is similar to a rating assigned to the at least one additional video by a user for which the user-rating of the video is estimated;

identifying, by the prediction module, a second set of users, each user of the second set of users having established a social network connection with the user for which the user-rating of the video is estimated, having assigned a rating to the video, and not being included in the first set of users;

predicting, by the prediction module, the estimated user-rating that the user is likely to assign to the video based on a combination of a first prediction generated based on ratings data for the first set of users and a second prediction generated based on ratings data for the second set of users;

adding, by a recommendation module, the estimated user-rating of the video to additional estimated user-ratings of other videos that the user is likely to assign to the other videos;

identifying, by the recommendation module, one or more top-rated videos based on the estimated user-rating and the additional estimated user-ratings; and communicating, by the recommendation module, a notification via a client device of the user for which the user-rating of the video is estimated that recommends the one or more top-rated videos.

2. A computer-implemented method as recited in claim 1, the second set of users including at least one user that is followed by the user for which the user-rating of the video is estimated and does not follow the user for which the user-rating of the video is estimated.

3. A computer-implemented method as recited in claim 1, the second set of users including at least one user that has assigned a rating to a video that the user for which the user-rating of the video is estimated has previously rated.

4. A computer-implemented method as recited in claim 1, each user of the first set of users having previously rated the video, wherein the user for which the user-rating of the video is estimated has not rated the video.

5. A computer-implemented method as recited in claim 1, further comprising:
   estimating a plurality of user-ratings that the user for which the user-rating of the video is estimated is likely to assign to a plurality of videos not rated by the user; and
   recommending the one or more top-rated videos based on the plurality of user-ratings, the estimated user-rating, and the additional estimated user-ratings.

6. A computer-implemented method as recited in claim 1, further comprising determining a social influence score for each user in the second set of users that represents how the user for which the social influence score is determined influences preferences of the user for which the user-rating of the video is estimated and weighting the second prediction using the social influence scores.

7. A computer-implemented method as recited in claim 1, wherein the first set of users is modeled as a user-by-video matrix, and the second set of users is modeled as a user-by-user binary matrix.

8. A computer-implemented method as recited in claim 1, wherein the second set of users is identified without inferring trust relationships between the user for which the user-rating of the video is estimated and users in the second set of users.

9. A system for incorporating social-network connections information into estimated user-ratings of videos for video recommendations, the system comprising:
   one or more processors; and
   a memory having instructions that are executable by the one or more processors to implement:
   a modeling module configured to:
      construct a social model representing social-network connections between a user and a first set of users; and
      create a ratings model representing ratings assigned to a set of videos by a second set of users that is different from the first set of users, the ratings model sharing a common factor with the social model representing how social connections of the first set of users in a social domain of the social model correlate with the ratings assigned to the set of videos;
   a prediction module configured to estimate a user-rating that the user is likely to assign to a video by incorporating both the social model and the ratings model into a collective matrix factorization algorithm; and
   a recommendation module configured to identify top-rated videos for recommendation to the user by comparing the estimated user-rating to additional estimated user-ratings of additional videos.

10. A system as recited in claim 9, wherein incorporating both the social model and the ratings model into the collective matrix factorization algorithm includes utilizing both the social model and the ratings model for each iteration of a loss function minimization algorithm.

11. A system as recited in claim 9, wherein the social model includes a user-user matrix having columns representing the first set of users and rows representing users for whom the ratings are to be predicted.

12. A system as recited in claim 9, wherein the social model comprises a binary matrix that represents the social-network connections of the user with the first set of users.

13. A system as recited in claim 9, wherein each user in the first set of users is identified as having previously rated at least one same video that the user previously rated.

14. A system as recited in claim 9, wherein the first set of users does not include a user included in the second set of users.

15. A computer-implemented method of incorporating social-network connections information into estimated user ratings of videos for video recommendations, the method comprising:
   constructing, by a modeling module, a social model representing social-network connections of a user with a first set of users that have previously rated at least one same video that the user has previously rated;
   creating, by the modeling module, a ratings model that represents ratings assigned to a set of videos by a second set of users being different from the first set of users and having rated the set of videos with ratings that are substantially similar to additional ratings assigned to the set of videos by the user;
   predicting, by a prediction module, a user-rating of a new video that the user is likely to assign to the new video, the user-rating being predicted using a factorization machine by at least converting the social model and the ratings model into a feature vector that is usable in the factorization machine to capture factorized interactions between the feature vector and a feature vector of another user; and
   communicating, by a recommendation module, a notification for display via a client device associated with the user to recommend top-rated videos to the user based on a comparison of the predicted user-rating with additional predicted user-ratings of other videos not rated by the user.

16. A computer-implemented method as recited in claim 15, wherein the feature vector includes at least a user portion, a video portion, and a normalized social portion.

17. A computer-implemented method as recited in claim 15, wherein the social-network connections include at least one asymmetric social-network relationship between the user and one other user that is not a follower of the user, the asymmetric social-network relationship indicating that the user is a follower of the one other user that is not a follower of the user.

18. A computer-implemented method as recited in claim 15, wherein the social model comprises a binary matrix.

19. A computer-implemented method as recited in claim 15, further comprising:
   repeating the constructing, creating, and predicting operations to generate a plurality of predictions that represent estimated user-ratings that the user is likely to assign to a plurality of videos; and recommending the top-rated videos from the plurality of videos based on the plurality of predictions.

20. A computer-implemented method as recited in claim 15, wherein the social model is constructed without inferring a trust relationship between the user and one or more other users that are connected to one of the user's social-network connections.

\* \* \* \* \*